UNITED STATES PATENT OFFICE.

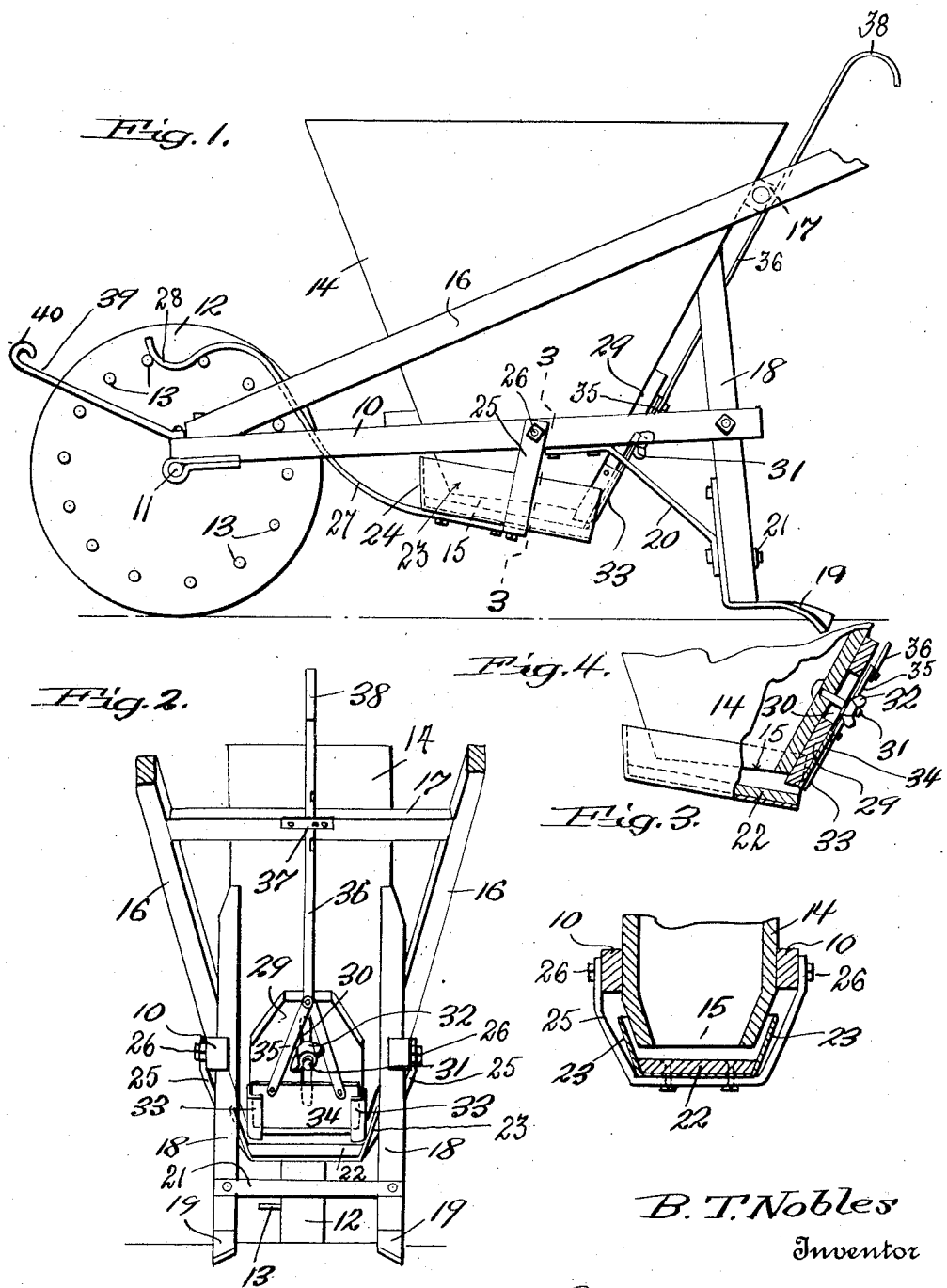

BLOUNT T. NOBLES, OF WINTERVILLE, NORTH CAROLINA.

FERTILIZER-DISTRIBUTER.

1,345,390.  Specification of Letters Patent.  Patented July 6, 1920.

Application filed July 3, 1919. Serial No. 308,453.

*To all whom it may concern:*

Be it known that I, BLOUNT T. NOBLES, a citizen of the United States, residing at Winterville, in the county of Pitt and State of North Carolina, have invented certain new and useful Improvements in Fertilizer-Distributers, of which the following is a specification.

This invention relates to fertilizer distributers, and has for one of its objects to simplify and improve the construction and increase the efficiency and utility of devices of this character.

Another object of the invention is to provide a device of this character having coacting means for controlling the flow of the fertilizer material or compound, and cutting off the flow when turning at the ends of the rows or at other times when required.

With these and other objects in view the invention consists in certain novel features of construction as hereafter shown and described and then specifically pointed out in the claims, and in the drawings illustrative of the preferred embodiment of the invention.

Figure 1 is a side elevation of the improved device.

Fig. 2 is a rear elevation.

Fig. 3 is a transverse section enlarged on the line 3—3 of Fig. 1.

Fig. 4 is a sectional detail illustrating the arrangement of the coacting valve and cut-off devices.

The improved device comprises a supporting frame including spaced side members 10 and carrying an axle 11 at one end to support a combined operating and traction wheel 12. Projecting laterally of the wheel 12 are a plurality of pins 13 designed to operate the distributing mechanism hereafter described.

Mounted upon the frame members 10 is a hopper or receptacle 14 having a contracted discharge opening indicated at 15 at the lower end, the lower lines of the discharge being inclined downwardly toward the rear of the apparatus, as shown by dotted lines in Fig. 1. Operating handle members 16 are connected to the frame members 10 at their forward ends and likewise connected by a transverse member 17 at the rear side of the receptacle 14. The transverse member 17 forms a rear support to the receptacle 14, while the lower portion of the receptacle is supported between the side members 10. By this means the receptacle is supported in vertical position with its discharging opening 15 directed downwardly beneath the lower line of the frame members 10. Disposed between the frame members 10 at their rear side are standards 18 having a covering plate 19 at their lower ends, the latter curving rearwardly and downwardly and likewise inclined inwardly to form covering members to move the soil inwardly over the distributed fertilizer material as the machine is drawn forwardly.

The standards 18 are suitably braced as indicated at 20 in Fig. 1, and likewise connected by a transverse member 21. Disposed beneath the discharge of the receptacle 14 is a distributer device comprising a flat bottom member 22 and sheet metal sides 23 and rear 24. The three parts 22, 23 and 24 forming a trough like structure open at the rear end. The sheet metal portion will preferably be in one piece extending beneath the bottom member 22 as shown in Fig. 3.

The distributing device is suspended from the frame members 10 by a bail-like member 25, the latter pivoted at 26 to the frame member.

Attached to the distributing device is an arm 27 extending rearwardly and upwardly and terminating in a downwardly curved portion 28 which is successively engaged by the teeth 13 when the wheel is rotated. By this arrangement it will be obvious that when the machine is moved forward over the ground the traction wheel 12 will cause the pins 13 to actuate the bar or arm 27 and thus vibrate the distributing apparatus and causing it to move to a limited extent upwardly and downwardly toward and away from the open discharging end of the receptacle 14, and thus uniformly and evenly distribute the material over the rear open end of the distributer member. Bearing against the rear face of the receptacle 14 is a controlling valve member 29 having a longitudinally directed slot 30 through which a bolt 31 extends. The latter having a wing nut 32 to enable the member 29 to be adjusted vertically against the rear face of the receptacle within the range of the slot 30. At its lower end the member 29 operates directly above the upper face of the bottom 22 of the distributer member, so that the space between the lower open end of the member 14 and the distributer member 22 may be readily controlled by adjusting the valve member 29, as will be obvious. By this means the amount of material to be distributed at each movement of the distributer member is readily controlled and increased or decreased by adjusting the members 29.

Attached to the valve member 29 at the side edges are guide way members 33 between which a cut-off member 34 is movable vertically, as illustrated in Fig. 2.

Connected to the cut-off member 34 are links 35 converging toward their upper end and united to an operating rod or bar 36, the latter extending through a keeper 37 on the member 17 and terminating in a hand grip portion 38. By this arrangement, it will be obvious that by adjusting the member 36 vertically through its keeper 37 the plates 34 may be correspondingly adjusted and moved into its downward position against the upper face of the distributing member 22, and thus cut-off the flow. The cut-off member 34 is thus operative independently of the movement of the valve 29, and may be adjusted to engage against the upper face of the member 22 no matter what position the valve may occupy. Thus the flow may be entirely cut off without disturbing the adjustment of the valve. The cut-off member is designed to be employed at the ends of the rows when the distributing of the material is not desired, or when the machine is to be moved from place to place and the distribution of the material not desired.

If required a suitable pull member 39 may be attached to the frame members 10 at their forward ends and extend in advance of the wheel 12 and terminating in a hook 40 to which a draft appliance may be applied, if it is required to move the device over the ground through the medium of a draft animal or other power.

The improved device may likewise be moved over the ground manually by employing the handle 16 in the ordinary manner as in a plow or hand cultivator.

The improved apparatus is simple in construction, can be constructed of any suitable material and of any capacity and will be found very useful for distributing fertilizer material in its pulverized or partly reduced condition, but is designed more particularly for the distribution of the fertilizer known as guano, but it is not desired to limit the invention to the use of any specific form of fertilizer material. The device may be readily adapted to distributing fertilizer material of various kinds by simply adjusting the distributing member or the controlling valve 29, as will be obvious.

Having thus fully described the invention what is claimed as new is:

1. A fertilizer distributer including a wheeled frame, supporting a hopper, a distributer having an open end beneath the discharge end of the hopper, a bail pivoted to the frame and extending beneath and secured to the distributer for swingingly mounting the same, means connected with the distributer and engaging the wheels on the frame for agitating the distributer, an adjustable closure for the open end of the distributer carried by the hopper, and a plate valve slidably mounted on the closure for periodically cutting off the discharge of fertilizer from the distributer.

2. A fertilizer distributer including a wheeled frame supporting a hopper, a distributer having an open end beneath the discharge end of the hopper, a bail pivoted to each side of the frame and extending beneath and secured to the distributer for swingingly mounting the same, means connected with the distributer and engaging the wheel on the frame for agitating the distributer, a closure member having an elongated slot therein mounted upon the hopper and adjustable over the open end of the distributer to control the delivery of fertilizer therefrom, means on the hopper and extending through the slot for adjusting the closing member, spaced guides on the closure member, a plate valve slidable in the guide ways for periodically cutting off the discharge of fertilizer from the distributer, links on the plate valve, and an adjustably mounted operating lever pivoted to the links for moving the valve to and from a closing position with respect to the open end of the distributer.

In testimony whereof, I affix my signature hereto.

BLOUNT T. NOBLES.